United States Patent [19]

Sakazume et al.

[11] 3,837,863
[45] Sept. 24, 1974

[54] PROCESS FOR PREPARING LIGHT-SENSITIVE SILVER HALIDE PHOTOGRAPHIC MATERIALS

[75] Inventors: Kaiichiro Sakazume, Tokyo; Eiichi Sakamoto, Hanno; Kiyomitsu Mine, Tokyo; Masaru Kanbe, Yamanashi, all of Japan

[73] Assignee: Konishiroku Photo Industry Co., Ltd.

[22] Filed: June 19, 1972

[21] Appl. No.: 264,286

[30] Foreign Application Priority Data
June 18, 1971 Japan.............................. 46-43286

[52] U.S. Cl...................... 96/130, 96/100, 96/109, 96/111, 96/114.5, 96/132, 96/137, 96/139
[51] Int. Cl.............................................. G03c 1/16
[58] Field of Search ............. 96/100, 120, 130, 139, 96/109

[56] References Cited
UNITED STATES PATENTS

| | | | |
|---|---|---|---|
| 1,297,046 | 3/1919 | Wall...................................... | 96/130 |
| 3,469,987 | 9/1969 | Owens et al. ......................... | 96/130 |
| 3,658,546 | 4/1972 | Van Doorselaer et al............ | 96/100 |
| 3,676,142 | 7/1972 | Carpentier et al.................... | 96/100 |

*Primary Examiner*—J. Travis Brown
*Attorney, Agent, or Firm*—Waters, Roditi, Schwartz & Nissen

[57] ABSTRACT

Light-sensitive photographic materials are prepared by incorporating various photographic additives into definite layers of light-sensitive silver halide photographic materials. The photographic additives are dissolved in a solvent and are then dispersed in a silver halide-gelatin colloid. The solvent used is a halogenated alcohol of the general formula (I) or (II),

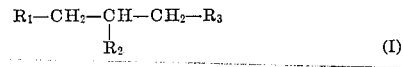

$$R_1-CH_2-CH-CH_2-R_3 \quad (I)$$
$$\overset{|}{R_2}$$

wherein $R_1$, $R_2$ and $R_3$ are individually a hydrogen atom, a chlorine atom or a hydroxy group, two of them being a chlorine atom and a hydroxy group, or

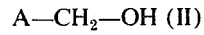

$$A-CH_2-OH \quad (II)$$

wherein A is $CF_3$ or $H(CF_2-CF_2)n$ (where $n$ is an integer of 1 to 3.).

5 Claims, No Drawings

PROCESS FOR PREPARING LIGHT-SENSITIVE SILVER HALIDE PHOTOGRAPHIC MATERIALS

This invention relates to a process for preparing light-sensitive silver halide photographic materials by incorporating various photographic additives into definite constitutive layers of light-sensitive silver halide photographic materials.

In case photographic additives, e.g. various cyanine dyes and merocyanine dyes (sensitizers for spectral sensitization) are desired to be incorporated into the layers of photographic materials, it has heretofore been an ordinary practice that the dyes are used in the form of solutions in lower alcohols such as ethanol, methanol, etc., because most of such dyes are difficultly soluble in water. However, the said dyes are not always very soluble in said organic solvents, and they have to be used at low concentrations by using large amounts of the solvents. Accordingly, when such organic solvents as mentioned above are applied to silver halide-containing gelatin colloids they cause deterioration of the physical properties of gelatin contained in the photographic emulsions, or bring about such detrimental effects that when the emulsions are coated on supports, crepe-like uneven portions or repelled portions are frequently formed all over the surfaces of the resulting layers. The above-mentioned phenomena are observed particularly in the cases where the emulsions are coated at a high rate, and thus have been causes for bringing about serious drawbacks in the preparation of light-sensitive photographic materials. For the above reasons, there has been demanded the advent of a process in which photographic additives (e.g., such sensitizing dyes as mentioned above), which are difficultly soluble or insoluble in methanol, ethanol and the like solvents, are dissolved to high concentrations and are dispersed in hydrophilic colloids.

The present invention provides an entirely novel process which meets the above-mentioned demand. That is, the present invention is a process in which each of the photographic additives is completely dissolved in a slight amount of a solvent and is then dispersed in a silver halide-gelatin colloid. The process of the present invention is a novel process which does not adversely affect the photographic properties of the resulting photographic material.

The solvent used in the present invention is a halogenated alcohol of the general formula (I) or (II),

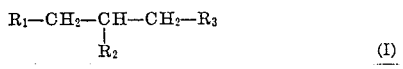

(I)

wherein $R_1$, $R_2$ and $R_3$ are individually a hydrogen atom, a chlorine atom or a hydroxy group, at least two of them being a chlorine atom and a hydroxy group, or $$A\text{-}CH_2OH \quad (II)$$

wherein A is $CF_3$ or $H(CF_2\text{-}CF_2)_n$ (where $n$ is an integer of 1 to 3).

Typical examples of the solvent used in the present invention are as follows:

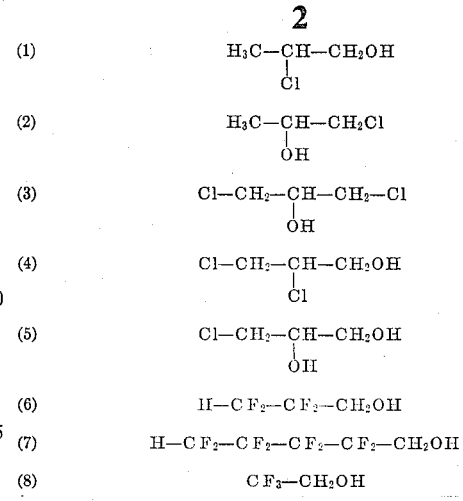

The solvent used in the present invention can form a high concentration solution even when a photographic additive, which is scarcely soluble in water, methanol or the like, is dissolved therein, and can quickly bring the photographic additive to a suitable concentration at room temperature (normal temperature), without requiring any heating or pulverization. Further, the solvent used in the present invention has no detrimental effect on the photographic properties of the resulting photographic film, and hence is not required to be removed according to such operation as disclosed in Japanese Patent Publication No. 22,948/69, in which the solvent used is removed by heating at an elevated temperature.

As solvents to be used for dissolving photographic additives, there have heretofore been proposed, for example, ethylene glycol or its derivatives; methyl cellosolve or its derivatives; dimethyl sulfoxides; phenol and cresol or their derivatives; benzyl alcohol; phenoxyethanols; etc. These solvents, however, have drawbacks in that they are inconvenient in handling due to their state of solution, odors, etc. and that they reduce the storability of the resulting solutions or impair the photographic properties, coatabilities and physical properties of photographic emulsions to which the solutions have been added.

The solvents according to the present invention have no such drawbacks as mentioned above, and do not bring about any injury in the coatabilities of photographic emulsions to which the resulting solutions have been added, even when the emulsions are coated at a rate of more than 40 m. per minute.

The solvents used according to the present invention are applicable not only to such photographic additives as, for example, spectral sensitizing dyes (cyanine dyes, merocyanine dyes, hemicyanine dyes and styryl dyes), other dyes, pigments, stabilizers, hardeners and coating aids which are difficultly soluble in such solvents as water, methanol, ethanol and the like, but also to photographic additives which, despite their being soluble in water, methanol, ethanol and the like, are desired to be formed into higher concentration solutions.

The solvents according to the present invention may be used in combination of two or more, or may be used in admixture with other solvents such as, for example, water, methanol, ethanol and the like.

The layers of light-sensitive photographic materials, to which the present invention is applicable, include not only silver halide photographic emulsion layers but also inter layers, protective layers, filter layers, sub layers, antihalation layers, etc. Further, the emulsions may be any of those which are used for black-white films, roentgen films, lithographic films, color films and silver dye bleaching films, and may have been subjected to chemical sensitization using noble metals, sulfur or polyalkylene oxide type sensitizers.

The present invention is illustrated in detail below with reference to examples, but the invention can be modified within a wide scope without being limited to these examples. In these examples, the compound No. as indicated is referred to one of the exemplified solvents as numbered hereinbefore.

EXAMPLE 1

A high speed silver iodobromide emulsion containing 5 mole percent of silver iodide was incorporated with a gold sensitizer and subjected to second ripening, and then the emulsion was equally divided into 3 portions. Each emulsion thus divided was spectrally sensitized by addition of each of sensitizing dye solutions of the dye D-1 set forth below which had been prepared in such manners as described below.

Dye D-1:

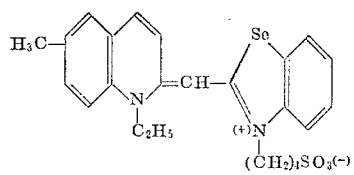

Spectral absorption maximum: 497 m$\mu$ (in methanol)

a. To 50 mg. of the dye D-1 was added 10 ml. of the compound (1) according to the present invention to form a dye solution. The solubility of the dye was quite high. This dye solution was added to 1 kg. of the above-mentioned emulsion to prepare a sample (a).
b. To 50 mg. of the dye D-1 was added 10 ml. of the compound (4) according to the present invention to form a dye solution. The solubility of the dye was as good as that in the case of (a). This dye solution was added to 1 kg. of the above-mentioned emulsion to prepare a sample (b).
c. To 50 mg. of the dye D-1 was added methanol to form a dye solution. The amount of methanol required to completely dissolve the dye was 98 ml. This dye solution was added to 1 kg. of the above-mentioned emulsion to prepare a control sample (c) according to a conventional process.

Each of the thus treated emulsions was incorporated with a suitable amount of 4-hydroxy-6-methyl-1,3,3a-7-tetrazaindene, and the total amount of the emulsion was adjusted by addition of water. Subsequently, the emulsion was uniformly coated on a film base to a dry film thickness of 5 $\mu$ to prepare a sample.

The thus prepared samples were individually subjected to a sensitometer, Model KS-1 (manufactured by Konishiroku Photo Industry Co., Ltd.), exposed to a 160 lux day light lamp (5,400°K), through a green filter having a transmission maximum at 525 m$\mu$, and then developed at 20°C. for 5 minutes with a developer of the following composition:

| | | |
|---|---|---|
| Metol (N-methyl-p-aminophenol sulfate) | 3 | g. |
| Anhydrous sodium sulfite | 50 | g. |
| Hydroquinone | 6 | g. |
| Sodium carbonate (monohydrate) | 29.5 | g. |
| Potassium bromide | 1 | g. |
| Water to make | 2 | liters |

Photographic properties of the samples were as shown in Table 1, in which the speed is a relative green light speed calculated by assuming as 100 the green light speed of the control sample (c).

Table 1

| Sample | | Speed | Fog | Sensitivity maximum (m$\mu$) |
|---|---|---|---|---|
| (a) | Present invention | 100 | 0.04 | 545 |
| (b) | do. | 102 | 0.04 | 545 |
| (c) | Control | 100 | 0.04 | 545 |

Table 1 shows that the samples (a) and (b) according to the process of the present invention are by no means inferior either in speed or in fog to the control (c), which was prepared according to the conventional methanol method. No change in coatability was observed in the samples according to the present invention.

EXAMPLE 2

The same emulsion as in Example 1 was treated in entirely the same manner as in Example 1, and then spectrally sensitized by addition of a dye solution formed by dissolving the dye D-2 set forth below in each of the compound (6) of the present invention and methanol.

Dye D-2:

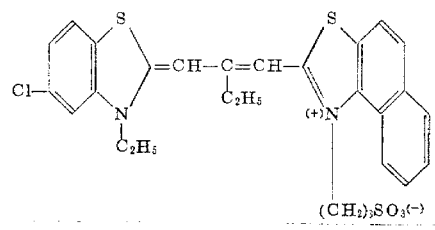

Spectral absorption maximum: 560 m$\mu$ (in methanol)

The amounts of the dye and the solvents used were as set forth in the following table:

| | Present process (d) | Conventional process (e) |
|---|---|---|
| Exemplified dye D-2 | 60 mg. | 60 mg. |
| Exemplified compound (6) | 13 ml. | — |
| Methanol | — | 180 ml. |
| Total amount of solvent | 13 ml. | 180 ml. |

From the above table, it is understood that according to the conventional process using methanol, the amount of the solvent required for completely dissolving the dye was as large as 180 ml., whereas according to the present process, the dye in the same amount as above could be completely dissolved by use of the solvent in as small an amount as 13 ml., i.e. less than about 1/10 of the amount of the solvent required in the conventional process.

From the above, it will be understood that the present invention also has such the advantage that the solvent, which is injurious to photographic emulsion colloids, may be used in smaller amount.

Each of the red-sensitive emulsions prepared in the above manner was dip-coated on a subbed base to a dry film thickness of 5 μ to obtain samples. The results of sensitometry of the thus obtained samples and the coatabilities thereof were as shown in Table 2, in which the speed is represented by a relative speed measured through a red filter transmitting lights of more than 600 mμ, and the coatability is represented by the number of reticulate, uneven portions per $m^2$ of the coated film.

Table 2

| Sample | Speed | Fog | Coatability |
|---|---|---|---|
| (d) Present process | 100 | 0.03 | 0 |
| (e) Conventional process | 100 | 0.03 | 4 |

As is clear from Table 2, it is noted that according to the present process, the emulsion could not only be spectrally sensitized with high efficiency without any difference in photographic properties from properties according to the conventional process but also be markedly improved in coatability on a film base, and no uneven portions were formed at all on the film surface.

EXAMPLE 3

A low speed silver chlorobromide emulsion for photographic positive was subjected to a second ripening and was then equally divided into 3 portions. The thus divided emulsions were spectrally sensitized by addition of dye solutions. That is, to 1 kg. of each emulsion was added each of the below-mentioned dye solutions (f), (g) and (h), and the emulsion was sufficiently stabilized in color sensitization.

Dye D-3:

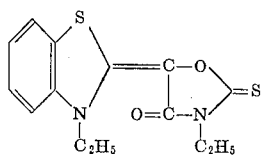

Spectral absorption maximum: 405 mμ (in methanol)

Dye solution (f):
 {Dye D-3  30 mg.
 {Compound (2)  10 ml.
Dye solution (g):
 {Dye D-3  30 mg.
 {Compound (8)  10 ml.
Dye solution (h):
 {Dye D-3  30 mg.
 {Ethanol  60 ml.

Thereafter, the emulsions were individually incorporated with a suitable amount of 4-hydroxy-6-methyl-1,3,3a-7-tetrazaindene and with a hardener and a coating aid, and then coated on a film base to a dry film thickness of 6 μ to prepare samples (f), (g) and (h). According to the process adopted in Example 1, the thus prepared samples were measured in white light speed both immediately after preparation and after incubation at high temperature and humidity. The results obtained were as set forth in Table 3, in which the speed is a relative speed calculated by assuming as 100 the speed immediately after preparation of the control sample containing the control dye solution (h).

Table 3

| Sample | | Immediately after preparation | | After incubation at high temperature and humidity | | | |
|---|---|---|---|---|---|---|---|
| | | | | 55°C., 3 days | | 50°C., 80% RH, 3 days | |
| | | Speed | Fog | Speed | Fog | Speed | Fog |
| (f) | Present Invention | 100 | 0.03 | 102 | 0.04 | 100 | 0.03 |
| (g) | do. | 102 | 0.03 | 100 | 0.03 | 100 | 0.03 |
| (h) | Control | 100 | 0.03 | 100 | 0.04 | 98 | 0.03 |

Table 3 shows that the samples (f) and (g) prepared according to the present process are not deteriorated at all in photographic properties even under severe conditions.

The dye solutions (f) and (g) according to the present invention formed no uneven or wrinkled films and were better in coatability than the control dye solution (h).

EXAMPLE 4

A silver iodobromide color photographic emulsion was subjected to gold sensitization and sulfur sensitization, and then to 200 second ripening. Immediately before completion of the ripening, the emulsion was equally divided into 3 portions, and each divided emulsion was spectrally sensitized by adding to 1 kg. of the emulsion each of such dye solutions of the dye D-4 as shown in Table 4.

On the other hand, a given amount of 4-chloro-1-hydroxy-2-n-octyl naphthamide as a color coupler was dissolved at an elevated temperature in a mixed solvent comprising di-n-butyl phthalate and acetic acid, and the resulting solution was dispersed in a gelatin solution by use of sodium alkylbenzenesulfonate to form a coupler dispersion.

The thus formed coupler dispersion was added to each of the aforesaid emulsions. Subsequently, the emulsions were individually incorporated with given additives, adjusted to pH 6.8 and then controlled in amount to obtain red-sensitive color photographic emulsions. Each of the thus obtained emulsions was coated on a film base to a dry film thickness of 6 μ to prepare samples.

The samples thus prepared were individually exposed in the same manner as in Example 2, and then developed at 20°C. for 10 minutes with a color developer of the following composition:

| | |
|---|---|
| Benzyl alcohol | 3.8 ml. |
| Anhydrous sodium sulfite | 2.0 g. |
| N-Ethyl-N-β-methanesulfon-amidoethyl-3-methyl-4-aminoaniline sulfate | 2.5 g. |
| Sodium hexametaphosphate | 2.0 g. |
| Sodium carbonate (monohydrate) | 50.0 g. |
| Potassium bromide | 1.0 g. |
| Sodium hydroxide | 0.6 g. |
| Water to make | 1 liter |

Thereafter, the samples were subjected to bleaching and fixing and then measured in photographic properties. The results obtained were as set forth in Table 4, in which the speed is a relative speed calculated by assuming as 100 the speed of the control sample. Dye D-4:

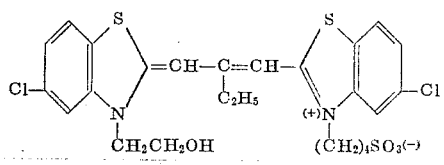

Spectral absorption maximum: 555 mμ (in methanol)

Table 4

| Sample | | Amount of dye solution/kg emulsion | | Speed | Fog |
|---|---|---|---|---|---|
| (i) | Present invention | Dye D-4 Compound (2) | 50 mg. 15 ml. | 100 | 0.06 |
| (j) | do. | Dye D-4 Compound (6) | 50 mg. 15 ml. | 101 | 0.06 |
| (k) | Control | Dye D-4 Methanol | 50 mg. 100 cc. | 100 | 0.06 |

From Table 4, it is clear that even when subjected to development using a color coupler-containing developer, the samples prepared according to the present process show the same photographic properties as those of the control prepared according to the conventional process. The amount of solvent set forth in Table 4 is the amount required for completely dissolving 50 mg. of the dye D-4, and it is understood that the amount of solvent required in the present process may be far smaller than in the conventional process.

EXAMPLE 5

The solubilities of 4-hydroxy-6-methyl-1,3,3a-7-tetrazaindene, which is a known stabilizer for silver halide emulsion, in water (a solvent used in the conventional process) and the compound (6) (a solvent used in the present process) were tested to obtain the results as set forth in Table 5. The test was effected by dissolving the stabilizer at an elevated temperature in each solvent and then allowing the resulting solution to stand at room temperature (20°C.) for 3 days to observe the state of the solution.

Table 5

| | 4-Hydroxy-6-methyl-1,3,3a-7-tetrazaindene | Kind and amount of solvent | Solution state |
|---|---|---|---|
| Conventional process | 1 g. | H₂O 50 ml. | Precipitate formed, not favorable |
| | 1 g. | do. 100 ml. | Slight precipitation, somewhat favorable |
| Present process | 1 g. | Compound (6) 30 ml. | Transparent solution, favorable |
| | 1 g. | do. 50 ml. | do. |

From Table 5, it is clear that according to the present process, 4-hydroxy-6-methyl-1,3,3a-7-tetrazaindene can be dissolved to such a high concentration as about 2 to 3 times the concentration in the case of the aqueous solution according to the conventional process, with the result that when the stabilizer solution is added to a photographic emulsion, the emulsion is not so diluted as in the conventional process. It is therefore possible to obtain a light-sensitive photographic emulsion layer higher in concentration of stabilizer and greater in content of silver.

When a given amount of the above-mentioned stabilizer solution was added to the same silver halide emulsion as in Example 1, no change was observed in the stabilizing effect of the stabilizer, and the emulsion showed the same photographic properties as in the case of the conventional process.

EXAMPLE 6

The solubilities of a mucohalogeno-acid (mucochloric acid), which is a known hardener for silver halide emulsion, in water (a solvent used in the conventional process) and the compound (3) (a solvent used in the present invention) were tested to obtain the results as set forth in Table 6. The test was effected by dissolving the hardener at an elevated temperature in each solvent and then allowing the resulting solution to stand at room temperature (about 20°C.) for 3 days to observe the state of the solution.

Table 6

| | Muco-chloric acid | Kind and amount of solvent | | Solution state |
|---|---|---|---|---|
| Conventional process | 1 g. | H₂O | 20 ml. | Precipitate deposited, not favorable. |
| | 1 g. | do. | 50 ml. | Transparent solution, favorable. |
| Present process | 1 g. | Compound (3) | 10 ml. | Transparent solution, favorable. |
| | 1 g. | do. | 25 ml. | do. |

From Table 6, it is clear that according to the present process, the hardener mucochloric acid can be dissolved to such a high concentration as about 2 to 5 times the concentration in the case of the conventional process, with the result that when the hardener solution is added to a silver halide photographic emulsion, the emulsion is not so diluted as in the conventional process to make it possible to obtain a light-sensitive photographic emulsion layer which is sufficient in hardening effect.

When a given amount of the above-mentioned hardener solution was added to the same silver halide emulsion as in Example 1, the hardening effect of the hardener and the photographic properties of the emulsion were entirely identical with those in the conventional process.

What we claim is:

1. A process for preparing light-sensitive silver halide photographic materials comprising dissolving a photographic additive in a solvent selected from the group consisting of halogenated alcohols of the general formula

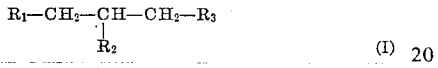
(I)

wherein $R_1$, $R_2$ and $R_3$ are individually hydrogen, chlorine or a hydroxy group, two of them being chlorine and a hydroxy group, and those of the general formula $$A\text{-}CH_2OH \qquad (II)$$

wherein A is $-CF_3$ or $-(-CF_2\text{-}CF_2\text{-})_n\text{-}H$ (where $n$ is an integer of 1 to 3), and incorporating the resulting solution in a layer of a light-sensitive silver halide photographic material.

2. A process for preparing a light-sensitive silver halide photographic material as claimed in claim 1, wherein said solvent solution is added to a hydrophilic colloid dispersion.

3. A process for preparing a light-sensitive silver halide photographic material as claimed in claim 1, wherein said photographic additive is a sensitizing dye, a pigment, a stabilizer, a hardener or a coating aid.

4. A process for preparing a light-sensitive silver halide photographic material as claimed in claim 1, wherein said solvent is at selected from the group consisting of:

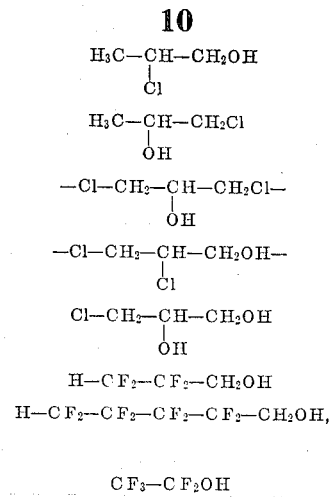

and $$CF_3\text{-}CF_2OH$$

5. A method of incorporating a difficulty water- or lower alcohol-soluble photographic additive into a hydrophilic colloid-containing layer of a light-sensitive silver halide photographic element, which comprises dissolving said photographic additive into a solvent selected from the group consisting of compounds of the general formula

(I)

wherein $R_1$, $R_2$ and $R_3$ are individually hydrogen chlorine or a hydroxy group, two of them being chlorine and a hydroxy group, and those of the general formula $$A\text{-}CH_2OH \qquad (II)$$

wherein A is $CF_3$ or $-(-CF_2\text{-}CF_2\text{-})_n\text{-}H$ (where $n$ is an integer of 1 to 3), and adding the resulting solvent solution to a hydrophilic colloid-containing layer-forming dispersion of emulsion which in turn is coated to form a layer constituting a part of the light-sensitive silver halide photographic material.

* * * * *